Feb. 10, 1925.   1,526,206
A. A. DOMINGUEZ, JR
ATTACHMENT FOR AUTOMOBILES
Filed July 31, 1924
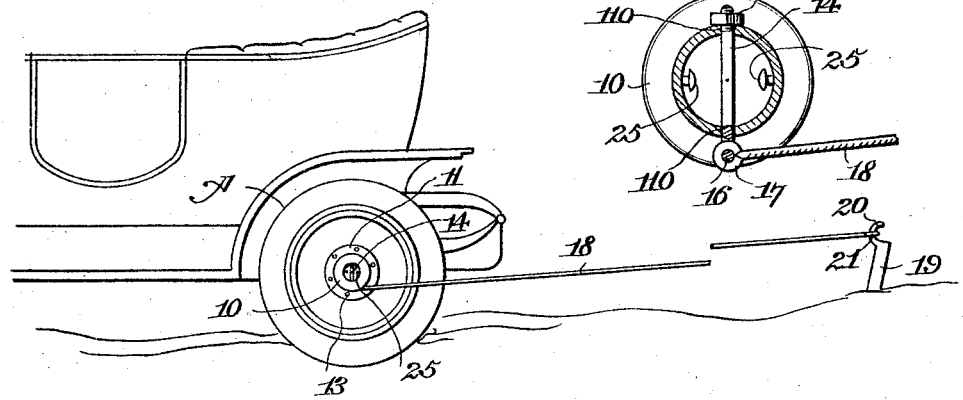
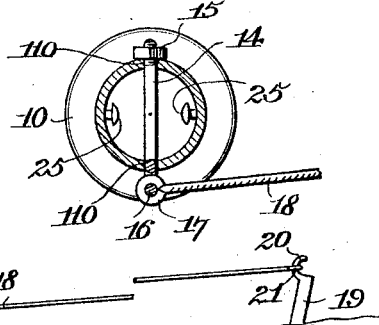
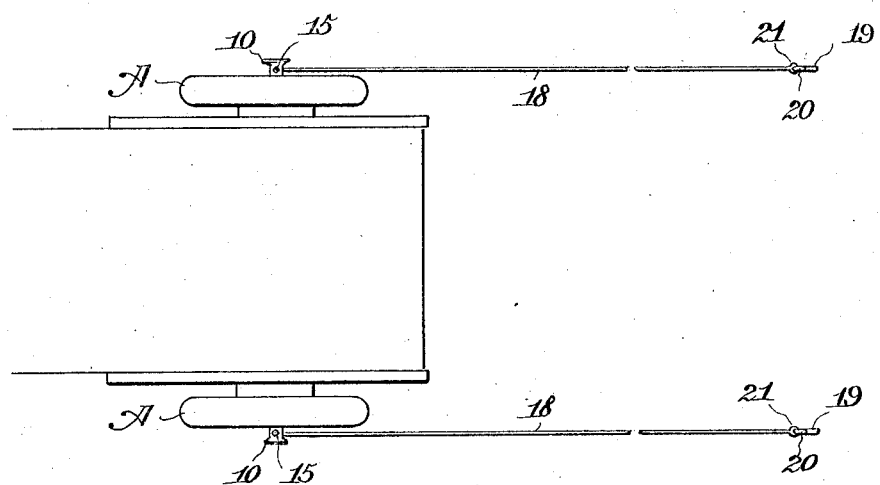
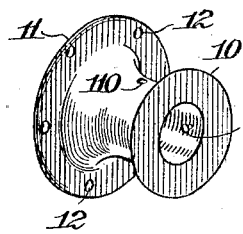
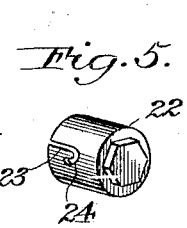
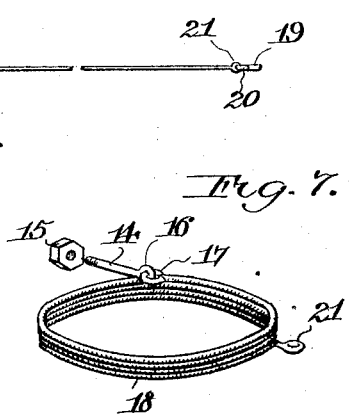
WITNESSES:
INVENTOR,
Albert A. Dominguez, Jr.
BY
ATTORNEYS.

Patented Feb. 10, 1925.

1,526,206

UNITED STATES PATENT OFFICE.

ALBERT ALEXANDER DOMINGUEZ, JR., OF SANTA BARBARA, CALIFORNIA.

ATTACHMENT FOR AUTOMOBILES.

Application filed July 31, 1924. Serial No. 729,386.

*To all whom it may concern:*

Be it known that I, ALBERT A. DOMINGUEZ, Jr., a citizen of the United States, and a resident of Santa Barbara, in the county of Santa Barbara and State of California, have invented a new and Improved Attachment for Automobiles, of which the following is a full, clear, and exact description.

My invention relates to means to be employed in connection with an automobile to cause the same to move to firm ground when the wheels are sunk in mud, loose sand or the like, and particularly the invention relates to a means whereby the power of the automobile is utilized to cause a cable or rope to wind up its convolutions about the axis of one of the hind wheels, for example, or the axis of one of the axles of the automobile, the cable having anchoring means at one end.

The general object of my invention is to provide a simple and practical means of the indicated character which may be readily applied to the wheels of the automobile and so formed and arranged as to promote convenience and dispatch in causing an automobile to move onto solid ground.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of my attachment showing the same in use, a part of the automobile being illustrated.

Figure 2 is a plan view of my improved attachment showing two of the same applied to two opposite wheels.

Figure 3 is an enlarged transverse sectional view taken through the drum at the cable securing bolt.

Figure 4 is a perspective view of the drum with the cap and bolt omitted.

Figure 5 is a perspective view of the drum cap.

Figure 6 is a perspective view of the anchor from one end of the cable, and

Figure 7 is a perspective view of the cable and its appurtenances showing the cable in coiled form as when not in use.

In constructing my invention in accordance with the illustrated example, a drum 10 is provided, having at the inner end thereof an annular flange 11 directed radially outward. Said flange 11 is adapted to be secured to a wheel A of an automobile at the hub of the wheel so as to turn with the wheel. The flange 11 in the example illustrated is particularly adapted to a wheel A of the disk type, for which purpose said flange is formed with holes 12 to receive bolts 13. The drum is formed with diametrically opposite holes 110 to receive a transverse bolt 14 having at one end a nut 15 and having at the opposite end means connecting it to a cable 18, the connecting means in the illustrated example consisting of an eye 16 on the bolt 14 and engaging an eye 17 on the cable or rope 18.

To anchor one end of the cable, a stake anchor 19 is provided adapted to be driven in the hard ground distant from the sunken automobile. Said anchor 19 has a hook 20 at the upper end thereof at one edge and disposed toward the opposite edge. The hook 20 is adapted to be engaged by an eye 21 at the end of the cable to be anchored.

The drum 10 is hollow and is adapted to receive a removable cylindrical cap 22. Said cap 22 has diametrically opposite slots 23 extending from the inner edge thereof, the inner ends of said slots being returned in curved form as at 24, the purpose of which slots is to engage the cap with pins 25 on the hollow drum 10 at the interior, said pins being headed. With the engagement of the cap 22 with the headed pins 25 and the said pins disposed in the curved portions 24 of slots 23, the cap will be held against accidental displacement. The removal of the cap 22 affords access to the interior of the drum to facilitate the insertion of the bolt 14 by guiding the end thereof through the diametrical two holes 110 in succession.

With the described attachment, when the automobile sinks in sand, mud or the like and the driven wheels turn without the car moving, the drum 10 is applied to each of the driven wheels A and the bolt 14 pertaining to each drum secured in place to hold one end of the cable. With the opposite end of the cable held by the anchor 19, the turning of the wheels A will wind the cables on the drums 10 and cause the car to move toward the anchor.

I would state in conclusion that while the illustrated example constitutes a practical embodiment of my invention, I do not limit myself strictly to the mechanical details herein illustrated, since, manifestly, the same can be considerably varied without departure from the spirit of the invention as defined in the appended claim.

Having thus described my invention, I claim:

An attachment to be employed for causing an automobile to move from a sunken position, said attachment comprising a hollow drum, means on the drum to secure it to the driven wheels of an automobile, said drum having diametrically opposite holes, a bolt extending transversely through the drum in said holes and adapted to have a cable attached thereto, a cap for the outer end of the hollow drum, and co-engaging means associated with the drum at the interior and embodied in the cap to detachably hold the latter to the drum.

ALBERT ALEXANDER DOMINGUEZ, Jr.